United States Patent [19]

Oishi et al.

[11] Patent Number: 4,669,018
[45] Date of Patent: May 26, 1987

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanawaga, Japan

[21] Appl. No.: 599,351

[22] Filed: Apr. 12, 1984

[30] Foreign Application Priority Data

Apr. 13, 1983 [JP] Japan .............................. 58-54016[U]

[51] Int. Cl.$^4$ ................................................ G11B 15/60
[52] U.S. Cl. ........................... 360/130.21; 360/130.33; 242/199
[58] Field of Search ........ 360/128, 132, 130.3–130.33, 360/130.21; 242/199; 226/196–199

[56] References Cited

U.S. PATENT DOCUMENTS

| | | | |
|---|---|---|---|
| 3,556,434 | 1/1971 | Koeppe | 242/199 |
| 3,934,842 | 1/1976 | Posso | 242/199 |
| 4,288,826 | 9/1981 | Sato | 242/199 X |
| 4,300,180 | 11/1981 | Sellers | 360/128 X |

Primary Examiner—A. J. Heinz
Attorney, Agent, or Firm—Sughrue, Mion, Zinn, Macpeak and Seas

[57] ABSTRACT

A cassette tape having a reduced amount of movement of the tape in the widthwise direction of the tape. A U-shaped shield plate is disposed between and behind guide poles which protrude on both sides of a magnetic head inserting hole. The shield plate has two end portions shaped so as to form a pair of substantially semicylindrically curved pieces extending in the widthwise direction of the shield plate. Each pair is fitted around a corresponding one of the guide poles. A cutout is formed between the curved pieces having a width slightly greater than the width of the magnetic tape, thereby forming a tape running path with the curved pieces.

2 Claims, 5 Drawing Figures

MAGNETIC TAPE CASSETTE

BACKGOUND OF THE INVENTION

The present invention relates to magnetic tape cassettes, and more particularly to a so-called hub-to-hub type compact magnetic tape cassette which has a shield plate assembly disposed behind guide poles which protrude on both sides of a magnetic head inserting hole and a leaf spring with a pressurizing pad.

Recently, cassette tape recorders have been reduced both in size and in weight, and accordingly cassettes used therein have also been miniaturized. In this connection, there has been a strong demand for provision of a cassette which is suitable for recording and reproducing signals with a high density and which has a long playing time.

The fundamental construction of a conventional cassette of this type is generally as shown in FIG. 1. The space in the cassette, defined by the upper and lower halves 1 and 2, is divided into a recording and reproducing region 4 and a winding core accommodating region 5 by an elongated partition 3. In the winding core accommodating region 5, a pair of winding cores 12 and two pairs of rotary guide rollers 13 are arranged between the upper and lower halves 1 and 2 in such a manner that they are symmetrical with respect to the center line C. In the recording and reproducing region 4, a pair of capstan inserting holes 6, a pair of positioning holes 7 and a pair of guide poles 8 are arranged between the upper and lower halves 1 and 2 in such a manner that they are symmetrical with respect to the center line C. Further, in the region 4, an assembly composed of a leaf spring 10 with a pressurizing pad 9 and a shield plate is provided behind the guide poles 8 arranged perpendicular to the center line C.

The assembly of the leaf spring 10 and the shield plate 11 is provided as follows: As shown in FIG. 2, the shield plate is U-shaped in section. The shield plate 11 is set between the front surface of the partition 3 and the rear surfaces of the guide poles 8. Then, both end portions of the leaf spring 10 are inserted into the gaps which are formed on both ends of the shield plate 11 and the rear surfaces of the guide pole 8.

The above-described conventional cassette provides a stable recording and reproducing operation with a long playing time. However, it is still desirable to improve the tracking error of the tape. In order to reduce the tracking error of the tape T, it has been required to prevent the tape T from shifting in the widthwise direction thereof. To accomplish this, in the upper and lower halves 1 and 2 of the conventional cassette, the partition 3 is provided with a greater length and volume than the other protruding members. Accordingly, the cassette halves 1 and 2 are liable to be strained after molding. Thus, it is difficult to maintain the desired degree of flatness.

As the degree flatness of the cassette halves 1 and 2 is degraded, the axes of seats for mounting the winding cores 12, the rotary guide rollers 13 and the guide poles 8 are shifted. As a result, at the rotary guide rollers 13 and at the guide poles 8, the parallelism of the tape guiding and supporting surface and the predetermined tape running plane is changed. Accordingly, the tape T is shifted in the widthwise direction from the predetermined tape running path, and tracking errors occur.

Also, such tracking errors can occur when the cassette is externally vibrated or shocked.

SUMMARY OF THE INVENTION

In view of the above-described drawbacks accompanying a conventional cassette, an object of this invention is to provide a magnetic tape cassette in which the occurrence of tracking error is prevented.

The foregoing object and other objects of the invention have been achieved by the provision of a magnetic tape cassette having a U-shaped shield plate disposed behind guide poles which protrude on both sides of a magnetic head inserting hole for guiding and supporting a magnetic tape, in which, according to the invention, the shield plate has two end portions, each of which is so shaped so to have two substantially semi-cylindrically curved pieces which are arranged in the widthwise direction of the end portion and a cutout between the curved pieces, the cutout having a width slightly larger than the width of the magnetic tape, the cutouts forming a tape running path with the curved pieces extending over the guide poles.

DESCRIPTION OF THE PREFERRED EMBODIMENTS

An example of a magnetic tape cassette according to this invention will be described with reference to FIGS. 3, 4 and 5.

Figure 1:
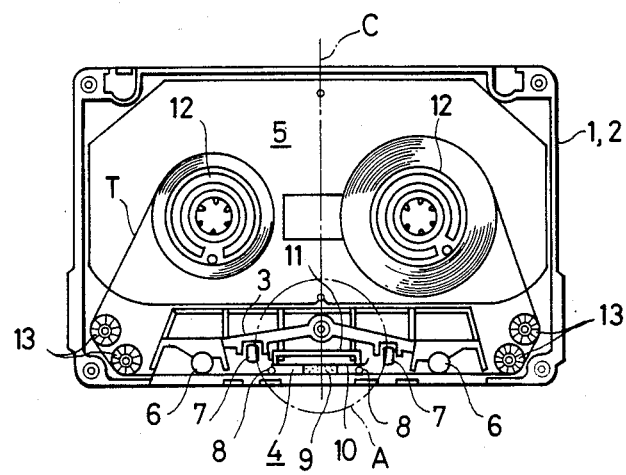
FIG. 1 is a plan view of a conventional magnetic tape cassette.
Figure 2:
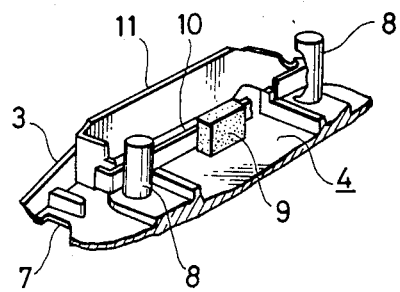
FIG. 2 is an enlarged perspective view showing a part A of FIG. 1.
Figure 3:
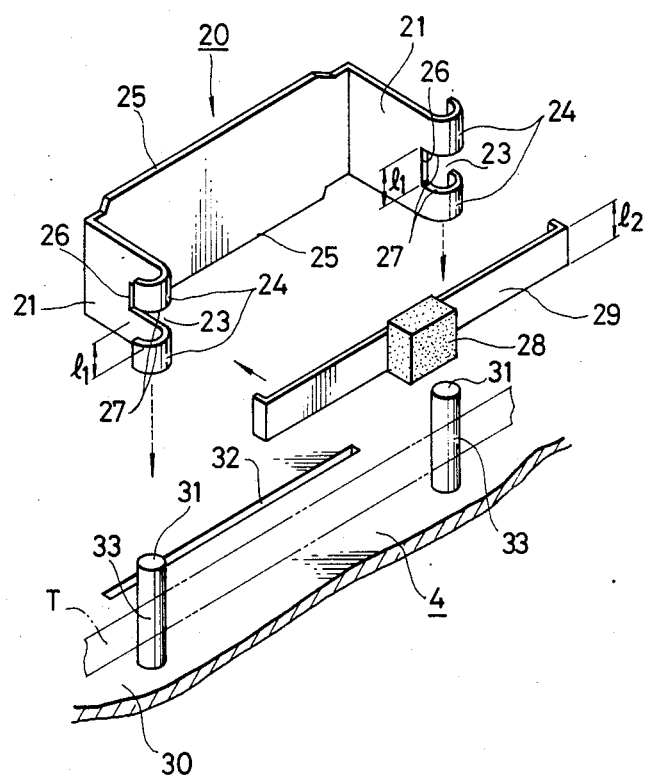
FIG. 3 is an exploded perspective view showing essential components of an example of a magnetic tape cassette according to the invention.

FIG. 3 is an exploded perspective view showing essential components of the cassette according to the invention, namely, a shield plate, a leaf spring with a pressurizing pad, and the lower half. As shown in FIG. 3, the shield plate 20 arranged in the recording and reproducing region 4 is U-shaped, similar to the conventional shield plate 11 (FIG. 2). Each of both end portions 21 of the shield plate 20 has two substantially semi-cylindrical curved pieces 24 and a rectangular cutout or slot 23 within the curved pieces 24 at the outer end.

The curvature of the curved pieces 24 is such that the curved pieces 24 can fit over guide poles 31 which extend from the lower half 30 for guiding the tape T. Each cutout 23 is horizontal so that the curved pieces 24 are vertically symmetrical with respect to the cutout 23. The width $l_1$ of the cutout 23 is slightly larger than the width of the tape T. In each cutout 23, its innermost edge 26 is made sufficiently deep so that, when the magnetic head is inserted, the tape passage is free from obstruction and the operation of the tape pad is also free from obstruction.

Both end portions of the leaf spring 29 with the pressurizing pad 28 are inserted into the cutouts 23. Under this condition, the leaf spring 29 is coupled to the lower half 30. In order to minimize the displacement of the pressurizing pad in the widthwise direction of the tape T, the width $l_2$ of the leaf spring 29 is slightly smaller than the width $l_1$ of the cutout 23.

The operation and effect of the cassette of the invention will be described according to the steps of assembling the cassette shown in FIGS. 4 and 5. FIG. 4 is a perspective view showing the shield plate 20, the lead spring 28 and the guide poles 31 which have been assembled. FIG. 5 is a sectional diagram taken along plane B as viewed in the direction of the arrow C.

Figure 4:
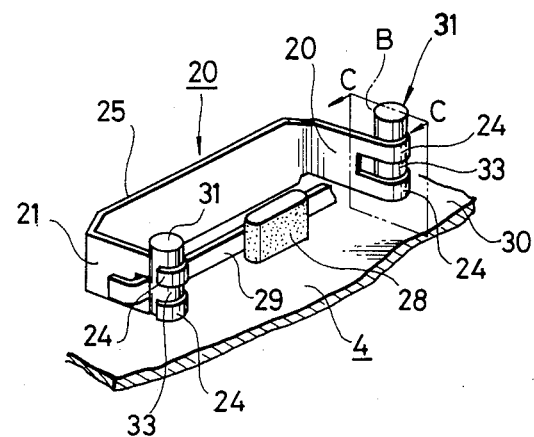
FIG. 4 is a perspective view showing the assembled essential components of the cassette according to the invention.
Figure 5:
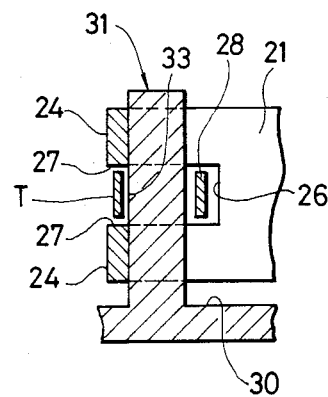
FIG. 5 is a sectional diagram taken along a plane B as viewed in the direction of the arrow C in FIG. 4.

As shown in FIG. 4, both end portions of the leaf spring 29 are inserted into the cutouts 23 of the shield plate 20 before the latter is mounted on the lower half of the cassette. The shield plate 20 has the upper and lower protruding edges 25 as shown in FIG. 3. The shield plate 20 combined with the leaf spring 29 is mounted on the lower half 30 by inserting the lower protruding edge 25 into an engaging groove 32 (FIG. 3) formed in the inner surface of the bottom of the lower half 30 and by fitting the curved pieces 24 on the guide poles 31. In this step, the curved pieces 24 are positioned respectively above and below the tape guiding and supporting surface 33 of the respective guide pole 31 with a step corresponding to the thickness of the shield plate 20 between the tape guiding and supporting surface 33 and the outermost surfaces of the curved pieces 24 as shown in FIG. 5. The tape T is laid to run along two opposed edges 27 of each cutout 23. That is, the tape T runs with its both edges in contact with the opposed edges 27. Thus, the displacement in the widthwise direction of the tape T is limited.

The movement in the widthwise direction of the tape T of the leaf spring 29 is limited by the opposed edges 27, and the movement in the direction perpendicular to the surface of the tape T of the leaf spring 29 is limited by the gaps which are formed between the innermost edges 26 and the rear surfaces of the guide poles. Thus, the leaf spring 29 is firmly held. Accordingly, the pressurizing pad 28 can satisfactorily pressurize the rear side of the tape T at all times.

The tape T, which has been connected to winding cores (not shown) as in the conventional cassette and wound on the winding cores, is slightly pulled out, and then the part of the tape T thus pulled out is laid along the tape running path. Under this condition, the upper half (not shown) is placed on the lower half 30, and then the upper and lower halves are fixedly combined together. Thus, the tape cassette has been assembled.

A groove similar to the engaging groove 32 of the lower half is formed in the inner surface of the bottom of the upper half. The shield plate 20 is positively held in place by the upper and lower halves with the upper protruding edge 25 inserted in the groove of the upper half.

The material of the shield plate 20 is not particularly limited. That is, it may be a conventional one such as permalloy-series metal or silicon steel.

In the cassette of the invention described above, both edges of the tape T are maintained in contact with the cutout 23 opposed edges 27 which are provided respectively above and below the tape guiding and supporting surface 33 so that displacement of the tape T in its widthwise direction is prevented. Accordingly, the tape T can be set at a suitable position with respect to the magnetic head at all times, with the result that the occurrence of tracking errors of the tape T is suppressed.

Since the shield plate 20 is made of metal, the shield plate has a high machining accuracy so that the displacement of the tape T can be minimized.

According to the invention, the positions of the tape T and the pressurizing pad 28 in the widthwise direction of the tape are limited by the opposed edges 27 of the cutouts 23. Accordingly, the relative position of the tape T and the pressurizing pad 28 in the widthwise direction of the tape is substantially maintained unchanged. As a result, the pressurization of the pressurizing pad 28 against the tape T is stable, and hence tracking error is effectively suppressed.

What is claimed is:

1. In a magnetic tape cassette including a pair of laterally spaced guide poles fixedly mounted to the cassette and protruding on opposite sides of a magnetic head inserting hole for guiding and supporting a magnetic tape, and a U-shaped shield plate disposed on the side of said guide poles opposite said magnetic tape and having a base extending between said guide poles and right angle parallel end portions extending outwardly of said base towards said guide poles, the improvement wherein said shield plate end portions terminate in substantially semi-cylindrical curved pieces fitted around respective guide poles, and rectangular cutouts within said curved piece, said cutouts having a width in the direction of said magnetic tape facing said curved pieces which is slightly in excess to the width of said magnetic tape; whereby, opposed edges of said cutouts within said curved pieces define a tape running path with the surfaces of said guide poles exposed by said cuts, whereby, the tape in moving in contact with the guide poles is prevented from shifting in the direction of its width by the confronting edges of said cutouts.

2. The magnetic tape cassette as claimed in claim 1, further comprising a leaf spring having a length in excess of the distance between the guide poles and the end portions of said U-shaped shield plate, and wherein said cutouts within said semi-cylindrical curved pieces are of a depth such that a gap exists between the guide poles and the end of said cutouts, said leaf spring having opposite end portions fitted into said gaps, a pressurizing pad affixed to said leaf spring at a center thereof and on a side of said leaf spring disposed towards said tape, and said leaf spring being bowed so that said spring pushes said pressurizing pad into contact with said tape.

* * * * *